Figure 1:
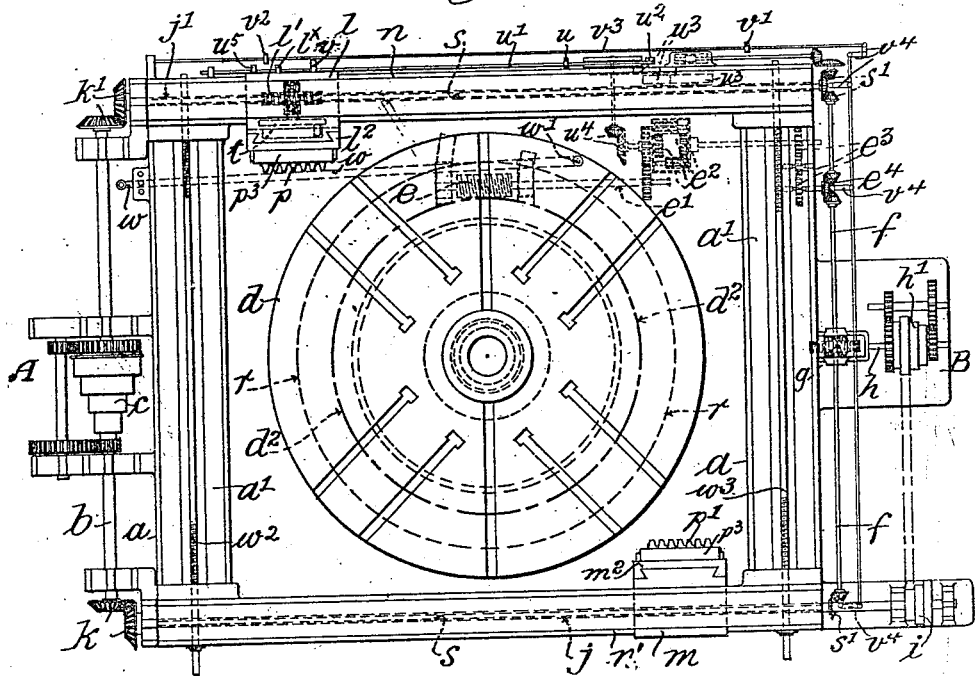

F. J. SPENCER & J. SPEIRS.
GEAR CUTTING MACHINE.
APPLICATION FILED DEC. 31, 1907.

946,161.

Patented Jan. 11, 1910.
3 SHEETS—SHEET 1.

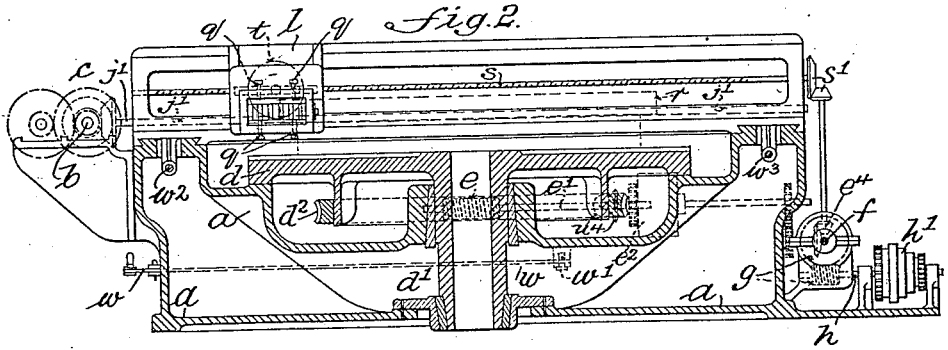
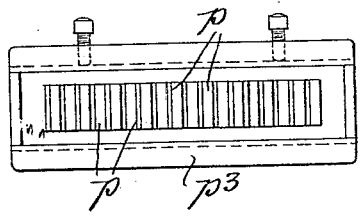
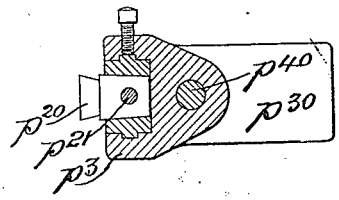
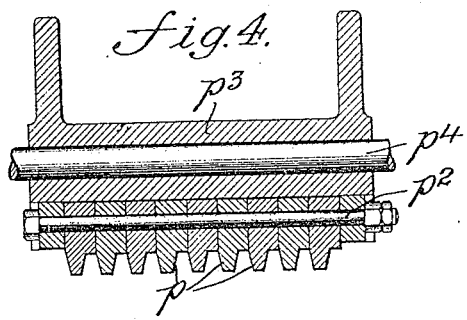
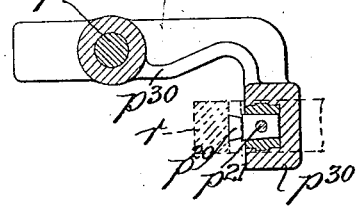
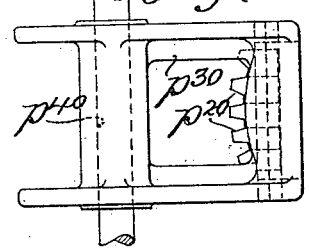

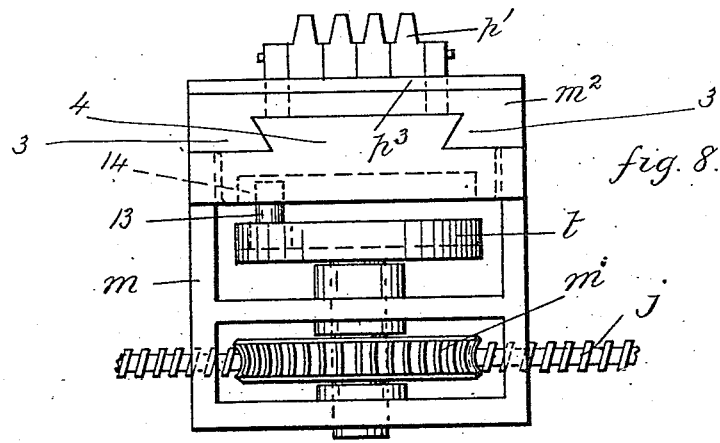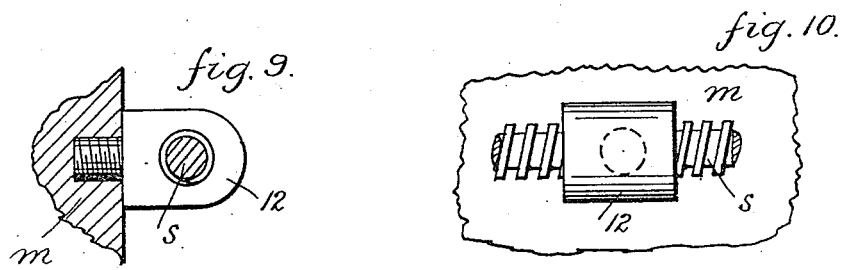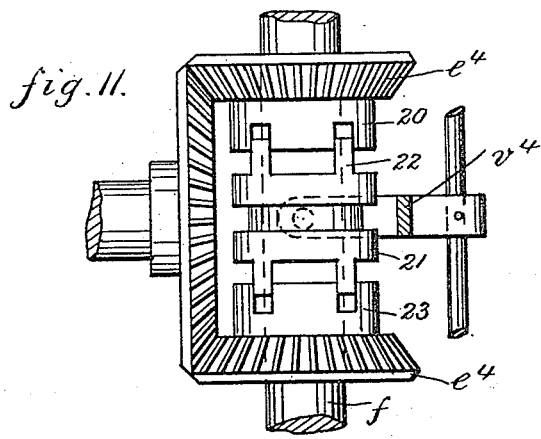

UNITED STATES PATENT OFFICE.

FRANK J. SPENCER AND JAMES SPEIRS, OF HUDDERSFIELD, ENGLAND.

GEAR-CUTTING MACHINE.

946,161.  Specification of Letters Patent.  Patented Jan. 11, 1910.

Application filed December 31, 1907. Serial No. 408,861.

*To all whom it may concern:*

Be it known that we, FRANK JOHN SPENCER and JAMES SPEIRS, subjects of King Edward VII of Great Britain, residing at Huddersfield, in the county of York, England, have invented certain new and useful Improvements in Gear-Cutting Machines, of which the following description, in connection with the accompanying drawings, is a specification.

This invention relates to gear cutting machines and particularly to a new or improved universal gear cutting machine for cutting toothed gears by means of two or more sets of reciprocating cutters, each cutter in each set having sides and faces or contours of the shape of the outline or contour of the tooth of a rack or gear, the exact form being or comprising the base of the system of the gear to be cut.

The object of our invention is to provide in an improved construction of machine, by which the use of templets or the cutting of special cutters for each gear is dispensed with, one set of cutters for each pitch notwithstanding the number of teeth to be cut in the wheel and means to obviate the spacing of the blank after each cut, the arrangement and mode of operation of the machine avoiding the transmission of strains to the machine, and accelerating the cutting of toothed gears.

According to our invention, we employ preferably two tool holding or cutter carriages each carrying a series of cutters whose form is the base of a rack or gear tooth, the said carriages being located at opposite sides of the machine so that the cutters may operate on two separate portions of the wheel blank at one time, or more than two carriages may be employed if required.

The cutting tools are of special construction to cut both on the forward and backward cutting strokes, and they are each mounted on studs secured to housings which are pivotally mounted on respective carriages in order that the cutters may have a slight angular movement to allow them to assume proper angles for clearing and cutting on both strokes of the carriages or blank. The gangs or series of cutters are fed past the blank at the requisite speed by a feed motion, rigidly controlled by mechanism which controls the worm shaft from which the blank is rotated, such worm shaft being controlled through a differential motion and change speed wheels and the whole of the said mechanism controlled through reversing bevels on a shaft driven by feed mechanism. The differential gear on the worm shaft is provided to give extra rotation to the wheel blank in order that the parts which are uncut when the cutters have passed beyond the blank in one direction, may be brought to such a position as to be operated upon by the cutters when the carriages make the return stroke, the said differential gear being controlled for this purpose from one of the cutter carriages. If necessary, sufficient cutters are secured in the carriages to cut the wheel in one operation.

The reciprocating cutters are arranged so that one half move in an opposite direction to the other half, whereby the strains are not communicated to the machine but kept contained within the wheel blank which is being cut. When the carriages are thus moved in opposite directions with the wheel blank between them, they form a couple contained in the blank itself which would continue to rotate and be cut at the proper pitch if the mandrel and feeding mechanism were entirely removed for the time being from its center.

The invention will be hereinafter fully described and more particularly pointed out in the appended claims, reference being had to the accompanying drawings, in which:—

Figure 1 is a plan view of a gear cutting machine embodying our improvements; Fig. 2 is a sectional elevation taken on line A. B. of Fig. 1; Figs. 3, 4 and 5 are respectively, front elevation, sectional plan view, and transverse section of the tools and tool holder constructed according to our invention; Figs. 6 and 7 are respectively, transverse section and plan view of the tools and tool holder as constructed and arranged for cutting internal toothed wheels; Fig. 8 is a detail plan view of the carriage $m$. Fig. 9 is a detail end view of the nut 12; and Fig. 10 is a plan view of the same. Fig. 11 is a detail plan view of the reversible clutch mechanism connected to the wheels $e^4$.

Referring to the drawings, and firstly to Figs. 1 to 5, letter $a$ represents the framing of the machine and $b$ the main driving shaft of the machine to which motion is conveyed from any suitable line shaft by belt, and cone pulleys $c$.

$d$ is a face plate supported in bearings $d'$, $d'$ formed in the framework of the machine. The face plate is provided with a worm wheel $d^2$ which meshes with a worm $e$ fast on a shaft $e'$ adapted to be driven through a differential gear $e^2$, change speed wheels $e^3$, and reversing bevel wheels $e^4$, from a constantly rotating shaft $f$. The said shaft $f$ obtains its motion through worm wheel and worm $g$ (Fig. 2) from a shaft $h$ having a cone pulley $h'$ thereon which is driven by belt from a cone pulley $i$ fast on a longitudinal screwthreaded shaft or worm shaft $j$ driven by bevel gears $k$ from the main driving shaft $b$. A screw threaded shaft or worm shaft $j'$ similar to the worm shaft $j$ is provided at the opposite side of the machine and is driven from the main shaft $b$ by bevel wheels $k'$. The worm shafts $j$ and $j'$ mesh with worm wheels $l'$, $m'$, mounted on carriages $l$, $m$, supported by and adapted to slide endwise on guides $n$, $n'$, the said carriages being made to receive tool holders $l^2$, $m^2$, in which are secured the tools or cutters $p$, $p'$ which extend inwardly toward the center of the machine. The tool-holders $l^2$ and $m^2$ are provided with dovetailed grooves 3 which are slidable vertically on dovetailed projections 4 on the carriages $l$ and $m$ respectively, as shown in Fig. 8, and the said tool-holders are provided with any approved means for sliding them vertically to any desired position and for securing them in that position. This vertical adjustment is commonly used for tool-holders, and it does not form an essential part of the present invention. The carriages $l$ and $m$ are slidable on or in the guides $n$ and $n'$, the said parts being constructed in any approved manner which will permit the carriages to slide freely lengthwise of the guides.

The principal feature of our invention comprises the employment in gear cutting machines of two or more gangs or sets of cutters, each set or gang comprising preferably a number of separate cutters arranged side by side in the form of a rack and having sides and faces of the shape of the outline or contour of the teeth of a rack, the two or more sets of cutters being adapted to operate at the same time on different portions of the wheel blank to cut a series of teeth on two or more sections of the blank in one traverse of each carriage in one direction, and another series of teeth on two or more uncut sections of the blank on the return traverse of the carriages, the cutter or tool holders being reciprocated vertically on each traverse and the cutters formed to cut on each stroke. Each gang or set of cutters is mounted on studs $p^2$ in a housing $p^3$ which is itself pivoted on a stud or spindle $p^4$ secured to the respective tool holder, the housing $p^3$ being movable about said stud $p^4$ within limits fixed by set screws $q$ (Fig. 2), in order that the cutters may have a slight movement in a vertical plane to allow them to assume proper angles for clearing and cutting on both strokes of the carriage. The wheel blank, indicated by dotted line at $r$, is secured to the face plate $d$ in any well known manner, being supported thereon in a horizontal plane coinciding approximately with the position of the cutters when about midway of their vertical movement, somewhat as illustrated.

The carriages are fed to and past the blank $r$ at the requisite speed by the screw-threaded shafts or worm shafts $s$, $s$ working through nuts 12 on the carriages and driven by reversing bevels $s'$, $s'$ from vertical shafts driven by bevel gears from the shaft $f$, one carriage, as $l$, moving to the right (Fig. 1), and the other carriage, as $m$, moving to the left, the cutters carried by each carriage engaging with the wheel blank at the same time and cutting spaces therein to form the teeth as the carriages travel past, the number of spaces cut in each side of the wheel blank being equivalent to the number of cutters employed in each gang or set. During this longitudinal traversing movement of the carriages $l$, $m$, the tool holders $l^2$, $m^2$ are caused to have a rising and falling reciprocating movement by means of disks $t$ (one only being shown at Fig. 1) secured on the axes of the worm wheels $l'$, $m'$ driven from the worm shafts $j$, $j'$, and having studs or pins 13 projecting eccentrically therefrom which enter horizontal slots 14 in the tool holders, the pin and slot connection giving an up and down movement to the respective tool holders, whereby the cutters or tools are carried up and down to an extent exceeding the depth of the wheel blank, and they cut both on their downward and upward strokes, the wheel blank being fed forward by the worm $e$ and worm wheel $d^2$ at a rate relative to the traverse of the carriages $l$, $m$ and moving in the same direction at the points of contact, the cutters thus cutting their respective spaces in the wheel blank and completing same by the time the cutters move out of mesh with the blank on the carriages approaching the extremity of their movement in one direction. When the cutters have passed clear of the wheel blank, a stop $l^\times$ on the carriage $l$ comes into engagement with a projection or adjustable collar $u$ on a rod $u'$ which is forced endwise in the same direction and through a lever $u^2$ connected therewith releases and allows to be set in action a dividing mechanism of any usual well known type (not shown), which through spur gears $u^3$ and bevel gears $u^4$ and the differential gear $e^2$ gives a quicker motion to the shaft $e'$ and through worm $e$ and worm wheel $d^2$ the wheel blank is revolved forward through a space relatively equal to the space taken up by a set or gang of cutters so as to present uncut sections immediately following the cut sections in positions for being operated on by the gangs of cutters on their return stroke. The members of the clutches $s'$, $s'$, $e^4$ enter or engage simultaneously, the dogs or teeth thereof being arranged so that they cannot free the motion in one direction until they have entered that in the reverse direction (the slip of the belt allowing for this), whereby the relative positions of the cutter and wheel blank are maintained, and it will not affect the accuracy of the wheel being cut no matter if the dividing takes place before, after, or during the reversal of the mechanism, for as the dividing is taking place through the differential $e^2$, it is independent of any other motion. The wheels $e^4$ have clutch members 20 and 23 on them, and a double clutch member is connected operatively with the shaft $f$ and engages with the clutch members 20 and 23 by means of its parts 21 and 22 as shown in Fig. 11, when slid on the shaft by means of the arm $v^4$. The wheel $s'$ are provided with clutch members of similar construction to the clutch members of the wheels $e^4$. A second collar $u^5$ on the rod $u'$ is engaged by the stop $l^x$ on the carriage in its return stroke to set in motion the dividing mechanism to give a forward movement to the wheel blank at the end of such stroke to present other uncut sections of the blank for the next traverse of the cutter carriages.

The motion of worm shafts $s$, $s$, is reversed at the end of each stroke by a projection $v$ on the carriage $l$ engaging a collar $v'$ or $v^2$ on a rod $v^3$ which through levers $v^4$ and clutch boxes, reverses the motion of the bevels $e^4$ and $s'$, $s'$ and consequently of the parts driven thereby.

By the movement of the carriages carrying the cutters in opposite directions with the wheel blank between them, a couple is formed contained in the blank itself, which would continue to rotate and be cut at the proper pitch if the mandrel and feeding mechanism were entirely removed for the time being from its center.

A cross feed comprising screws or worms $w^2$, $w^3$ is provided for bringing the tool carriages nearer to the center of the machine, the guides $n$, $n'$ being adapted to slide along the rails $a'$. By actuating the screws or worms $w^2$, $w^3$ the requisite amount during cutting, wheels with pitch lines other than circular may be cut, as in elliptic or like wheels. A lever $w$ pivoted at $w'$ and connected to the bracket carrying the worm $e$ and shaft $e'$, is employed in order that whenever necessary for any purpose, the said worm $e$ may be moved out of engagement with the worm wheel $d^2$, the disconnection of the worm $e$ from the worm wheel $d^2$ permitting the wheel blank when cut to be driven by its own worm or wheel and thus ground in its position without removal from the machine.

For cutting the teeth of internal wheels a gang of cutters $p^{20}$ arranged on a circular arc is mounted on a stud $p^{21}$, as shown in Figs 5, 6 and 7. The housing $p^{30}$ is arranged to overhang the wheel rim $r$ and is pivoted on the shaft $p^{40}$. When this device is used it is not connected to the traversing mechanism, but it is reciprocated in a vertical plane only.

What we claim is:

1. In a gear-cutting machine, the combination, with a supporting frame, and a revoluble face-plate for carrying the wheel blank; of a guide arranged to one side of the said face-plate and in a plane parallel to its face, a carriage slidable longitudinally of the said guide, reversing mechanisms for changing the direction of the revolution of the face-plate and the direction of the travel of the carriage, tappet-mechanism operated by the carriage and actuating the said reversing mechanisms simultaneously, a tool-holder slidable in the said carriage crosswise of the said guide, means for revolving the face-plate and for sliding the carriage so that they move in timed relation, and driving devices for reciprocating the said tool-holder.

2. In a gear-cutting machine, the combination, with a supporting frame, and a face-plate for carrying the wheel-blank journaled in the said frame; of two parallel guides arranged one on each side of the said face-plate, carriages slidable longitudinally on the said guides, driving devices operating to slide the said carriages simultaneously in opposite directions, reversing mechanisms for changing the direction of the revolution of the said face-plate and the direction of the travel of the said carriages, tappet-mechanism operated by one of the said carriages and actuating the said reversing mechanisms simultaneously, tool-holders slidable in the said carriages crosswise of the said guides, and driving devices for reciprocating the said tool-holders.

In testimony whereof we affix our signatures in the presence of two witnesses.

FRANK J. SPENCER.
JAMES SPEIRS.

Witnesses:
CHARLES W. SIDDLE
THOMAS H. BARRO